Oct. 29, 1957 H. A. HENNING ET AL 2,811,707
MATCHING CIRCUIT
Filed Dec. 29, 1955
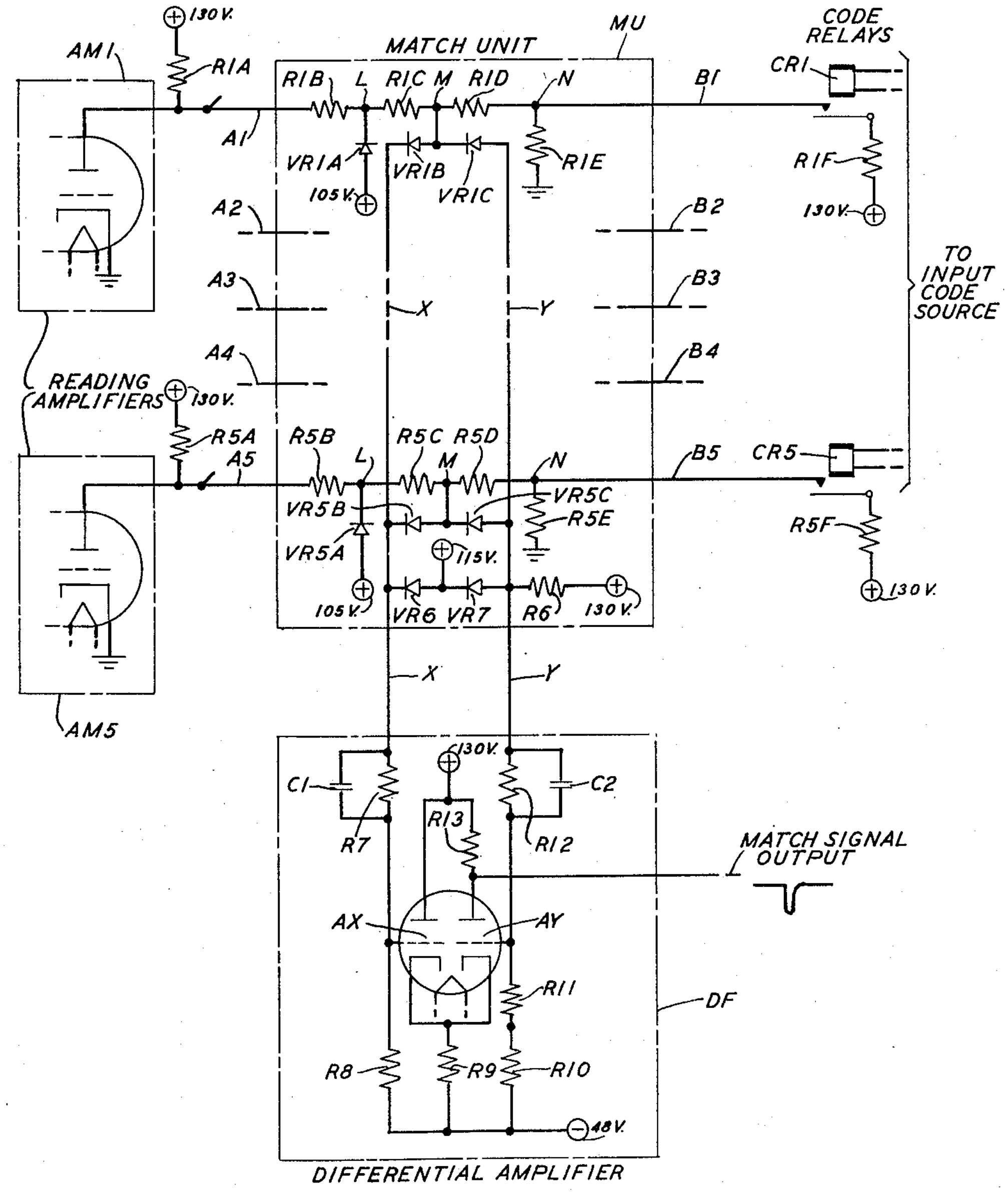
INVENTORS H. A. HENNING
O. J. MURPHY
BY Kenneth B. Hamlin
ATTORNEY United States Patent Office 2,811,707

Patented Oct. 29, 1957

2,811,707

MATCHING CIRCUIT

Harley A. Henning, Millington, N. J., and Orlando J. Murphy, New York, N. Y., assignors to Bell Telephone Laboratories, Incorporated, New York, N. Y., a corporation of New York Application December 29, 1955, Serial No. 556,261

3 Claims. (Cl. 340—149)

This invention relates to methods and apparatus for comparing two coded signals to recognize a match therebetween. More particularly, the present invention relates to a matching circuit for comparing a static binary signal code with a dynamic flow of potentially matching binary signal codes stored in a storage medium to determine when a match is obtained.

Matching circuits are employed in data storage systems, telephone systems, computers and other electrical circuits or systems to compare one item of data with another item of data, to compare one address code with another address code, to compare one number with another number or to compare one coded signal with another coded signal to determine when a match exists. In magnetic drum data storage systems, for example, items of data may be recorded on a magnetic drum in a plurality of individual areas with each area being identified by a distinctive address code recorded therein. To locate any particular item of data, the address codes recorded on the drum are successively read and compared in a matching circuit with the address code associated with the desired item of data. When the address code read from the drum matches the desired address code, a match signal will enable a gate to permit the desired item of data to be read out from the drum. One such magnetic drum data storage system is disclosed in the copending application of H. A. Henning, E. Jacobitti and B. F. Lewis, Serial No. 418,508, filed on March 25, 1954. In such systems, the desired address code is transmitted to one set of inputs of a matching circuit by the presence of either one or the other of two voltage levels on each of several conductors, each conductor representing a specific binary code element. Similarly, the address codes successively read from the magnetic drum in binary form are applied to the other set of inputs of the matching circuit. When the address codes match, a signal pulse is transmitted from the matching circuit to logic circuits which control the readout of the data stored on the magnetic drum. The function of a matching circuit of this type is, therefore, to recognize the presence or absence of an identity in two sets of binary codes. These codes may be a binary number representation, a two-out-of-five code, a one-out-of-ten code or any other code in which each code element is represented in binary form.

The two potential conditions used to represent each code element of the binary codes to be matched in such matching circuits may be applied to the input leads thereof in several ways. For example, the two potential conditions may be applied by electronic means such as through the operation of an amplifier or by mechanical means as through the closure of relay contacts or switch contacts. One voltage level may be applied to input leads when amplifiers are conducting or when relay contacts are closed and the other voltage level may be applied to input leads when amplifiers are cut-off or when relay contacts are open.

Difficulty caused by variations in amplitude of the two voltage levels used to represent individual binary code elements has heretofore been experienced in matching circuits of the type set forth above. These variations can cause such matching circuits to indicate a condition of mismatch when, in fact, a match condition exists. Matching circuits wherein the two voltage levels are applied to the input lead by electronic means are more susceptible to this difficulty than those wherein the voltage levels are applied by mechanical means. For example, these voltage level variations can be caused by aging of amplifier tubes, by fluctuation of supply voltages, by variations in the flux recorded on a magnetic drum which produce signals to control reading amplifiers or by aging of circuit components in electronic circuits. Furthermore, the number of code elements in a binary code applied to the input of matching circuits of the type set forth above has been limited heretofore to prevent excessive current drain in the input circuits which supply the two voltage levels representing each code element.

It is an object of the present invention to provide an improved matching circuit for comparing two binary signal codes to recognize a match condition therebetween.

It is also an object of the present invention to increase the reliability, dependability and accuracy of such matching circuits.

It is a further object of the present invention to increase the capacity of such matching circuits to enable a greater number of binary code elements to be simultaneously matched.

A feature of the present invention relates to circuits and apparatus for clamping the signal voltages to be compared in a matching circuit of the type set forth above to a predetermined excursion from a reference potential.

Another feature of the present invention relates to circuits and apparatus for maintaining a predetermined threshold potential in a matching circuit used to compare binary signal codes without drawing current from the input circuits supplying the signal codes to be matched.

A further feature of the present invention relates to an improved and more sensitive detecting means in matching circuits of the type set forth above for detecting conditions of match and mismatch.

The present invention is described in detail hereinafter by way of an illustrative embodiment of which the drawing forms a part. The manner in which the foregoing and other objects and features of the invention are achieved will be readily understood from the following description taken with reference to the accompanying drawing.

The drawing shows a schematic representation of an illustrative embodiment of the matching circuit of the present invention which utilizes the output of amplifier circuits for the dynamic flow of binary signal codes to be matched against a static or desired binary signal code obtained from the operation of code relays.

As shown in the drawing, the illustrative embodiment of the matching circuit of the present invention contains match unit MU with two sets of input leads designated A1 through A5 and B1 through B5 and a differential amplifier DF to detect the presence of a match in match unit MU. Input leads A1 through A5 are connected to the outputs of reading amplifiers AM1 through AM5 (of which amplifiers AM2 through AM4 are not shown). Amplifiers AM1 through AM5 are representations of reading amplifiers which are operative in response to the reading of recorded codes on a magnetic medium such as a magnetic drum. Input leads B1 through B5 are connected to the contacts of code relays CR1 through CR5 (of which relays CR2 through CR4 are not shown). Code relays CR1 through CR5 may be operated in any suitable manner in accordance with a desired code which is being sought in the medium. The illustrative embodiment of the matching circuit of the present invention disclosed in the drawing may be advantageously utilized as the matching circuit in the magnetic drum translator disclosed in the copending application of H. A. Henning, E. Jacobitti and B. F. Lewis, Serial No. 418,508, filed on March 25, 1954. It is to be undedstood, however, that the matching circuit of the present invention is not limited to use in magnetic drum data storage systems such as disclosed in this copending application nor is the matching circuit of the present invention limited to matching binary code inputs fed from amplifiers and relays. The circuit may be advantageously utilized to match any type of signal code in which each code element is in the binary form, that is to say, in which each input comprises either one or the other of two voltage levels. As shown in the drawing, input leads A1 through A5 will have either one or the other of two voltage levels depending upon the code representation applied thereto by the associated reading amplifiers AM1 through AM5. For example, if amplifiers AM1 through AM5 were not conducting current, input leads A1 through A5 will be at a potential of approximately +130 volts (assuming that the plate supply potential of amplifiers AM1 through AM5 is +130 volts, as shown in the drawing and that resistors R1A through R5A are low in value, compared to the other resistors in the match unit). If amplifiers AM1 through AM5 are conducting current, a negative going pulse of the order of 40 volts, for example, will be applied to input leads A1 through A5, dropping the potential thereon to approximately +90 volts. Thus, input leads A1 through A5 may be at either one of two voltage levels, +130 volts or +90 volts, which may be selected to represent a binary 0 or 1, respectively.

As shown in the drawing, input leads B1 through B5 will be either at one or the other of two voltage levels depending upon the code representation applied thereto by code relays CR1 through CR5. For example, if code relays CR1 through CR5 are operated, a potential will be applied through resistances, such as resistances R1F through R5F (of which resistances R2F through R4F are not shown), to input leads B1 through B5. This potential may be, for example, +130 volts as shown in the drawing. Resistances R1F through R5F are relatively low in value and serve as protective resistances only. Consequently, input leads B1 through B5 will be at a potential very near +130 volts. If code relays CR1 through CR5 are normal or unoperated, input leads B1 through B5 will be at a lower potential because of the open condition of the code relay contacts and the presence of resistances R1E through R5E which return to ground. Thus, input leads B1 through B5 may be at either one of two voltage levels, +130 volts or some lower voltage, depending on choice of resistance values; these two voltage levels may be used to represent a binary 1 or 0, respectively, originating from the code relays.

Although an identity of codes is being sought, it is not necessary to use identical signal voltages to represent identical codes from the two sources to be compared. As indicated above, a potential of +90 volts on the A— input leads represents a binary 1 and a potential of +130 volts represents a binary 0 while a potential of +130 volts on the B— input leads represents a binary 1 and a lower potential represents a binary 0. It will be observed that the voltages on the A— input and B— input leads are complementary in nature. In other words, a high voltage on the A— input leads represents a binary 0 whereas a low voltage represents a binary 0 on the B— input leads. Also, a low voltage (90 volts) on the A— input leads represents a binary 1 whereas a high voltage (+130 volts) on the B— input leads represents a binary 1.

When the potential on one of the A— input leads is applied to one terminal of a voltage divider network and the potential on a corresponding B— input lead is applied to the other terminal of the voltage divider network, the resulting potential at the midpoint M of this voltage divider network can have one of four possible values. When both signals match, that is, when the low potential representing a 1 on the A— input lead and the high potential representing the 1 on the B— input lead are applied to the voltage divider network, a potential at the midpoint M of the network will be somewhere intermediate between these two potentials. Similarly, when the potential on both leads represents a 0, the potential at the midpoint M will again have a value intermediate between these two potentials. By suitable choice of resistance values, these two intermediate potential values may be made to be the same. On the other hand, if the codes applied to the A— input lead and B— input lead do not match, the resulting potential at the midpoint M of the voltage divider network will be either above the intermediate potential which was made common to the first two conditions, or below said intermediate potential, thus indicating a mismatch of the two codes.

As indicated hereinbefore, one aspect of the present invention relates to a means for clamping the signal voltages to be matched to a predetermined excursion from a reference potential. Matching circuits of the type described herein have heretofore been susceptible to trouble conditions caused by signal voltage fluctuations resulting from aging of amplifier tubes, supply potential variations, etc., which cause errors in the matching of signal codes. Therefore, the input leads to a matching circuit which derive their signal voltages from electronic means may be advantageously applied to a clamping circuit to clamp the voltage excursion to a predetermined amount. As shown in the drawing, the output of reading amplifier AM1 on the lead A1 is applied to resistance R1B, the other end of which is connected through a catching diode VR1A to a low impedance potential source of +105 volts. The polarity of diode VR1A is such that it is biased in its back direction when the amplifier output voltage is more positive than +105 volts. Therefore, the voltage at point L, the junction of diode VR1A and resistance R1B, will follow the signal pulse output from amplifier AM1 until the latter falls below the reference voltage of +105 volts; beyond this point the voltage at point L remains near +105 volts while the further excursion of the output of amplifier AM1 is taken up as voltage drop across resistance R1B. In this manner, a standard signal of approximately a 25-volt negative excursion from a base potential of +130 volts is obtained at point L. The potential to be utilized as a reference potential is selected to be more positive than the expected potential output from the weakest amplifier. By applying the output to each of the amplifiers AM1 through AM5, feeding input leads A1 through A5, to a similar clamping arrangement having the same reference potential, standard signals are thus obtained on all A— input leads in matching unit MU. Accordingly, errors caused by signal voltage fluctuations heretofore experienced are eliminated.

In the event that the signal applied to an input lead of a matching unit is a positive excursion above a base potential instead of a negative excursion below a base potential as above described, the polarity of the catching diode, such as diode VR1A, will be reversed and the value of the reference potential selected so as to insure that a standard signal is obtained on the input lead to the matching unit. Furthermore, should the signal applied to an input lead of a matching unit have both a positive and negative excursion about a base potential, two diodes, such as diode VR1A, with opposite polarity and with suitable reference potentials may be connected in the circuit to insure a standard signal on the input lead to the matching unit.

Because inputs to matching circuits supplied by mechanical means such as relay contacts or switch contacts are not susceptible to fluctuations or variations, there is no requirement for such a clamping arrangement. Accordingly, as shown in the drawing, input leads B1 through B5 terminate in a resistance instead of a clamping circuit. In the event, however, that the signal voltages are applied to the B— input leads, for example, by electronic means rather than relay contact means as shown in the drawing, a clamping arrangement similar to that described above may advantageously be utilized to provide a standard signal on these leads.

Referring to the drawing, it will be noted that match unit MU of the illustrative embodiment of the present invention comprises five channels and each of the channels includes a clamping arrangement and a voltage divider network as indicated above. Each channel serves as a termination for one input lead of each of the two groups of input leads over which the binary codes to be matched are supplied. The uppermost channel in which the A1 lead and the B1 lead are terminated will now be described in detail. When reading amplifier AM1 is drawing no plate current (corresponding to a binary 0) and when code relay CR1 is unoperated (corresponding to a binary 0), a single path may be traced from the +130 volt plate supply potential for amplifier AM1 through resistances R1A, R1B, R1C, R1D and R1E to ground. Under these conditions, the potential at point L in the circuit, the junction of resistances R1B and R1C, is only a volt or so lower than the supply potential of +130 volts and, therefore, diode VR1A is biased in its back direction and plays no part in the action. The values of resistances R1A through R1E are such that a potential of approximately +115 volts is developed at the junction of resistances R1C and R1D, designated point M in the circuit. It is the potential at point M in the circuit which serves to indicate whether a match exists in this channel and the situation just described constitutes one of the two possible conditions of match.

The other condition of match occurs when code relay CR1 is operated (corresponding to a binary 1) and when amplifier AM1 is drawing plate current (corresponding to a binary 1). The output voltage on the A1 lead from amplifier AM1 drops to approximately +90 volts during the pulse, the exact value depending upon a number of factors, chief of which is the activity condition of the cathode of amplifier tube AM1. The downward swing of potential at point L in the circuit is restricted by catching diode VR1A and the potential at this point during the pulse assumes a value of +105 volts. The potential at point N, the junction of resistances R1D and R1E, will be very near +130 volts when the relay contact of code relay CR1 is closed because resistance R1F is relatively low in value and inserted for protective purposes only. Therefore, with the potential at point L at +105 volts and the potential at point N at approximately +130 volts, the potential developed at point M once again is of the order of +115 volts which, as indicated above, represents a match condition.

In addition to the two match conditions above described, there are two possible mismatch conditions. The first of these occurs when amplifier AM1 produces an output pulse (corresponding to a binary 1) and when code relay CR1 is unoperated and the contacts thereon are open (corresponding to a binary 0). Under these conditions, a potential of +105 volts is again developed at point L in the circuit. However, because input lead B1 goes to an open contact, the +105 volts is applied to resistances R1C, R1D and R1E in series and the voltage developed at point M (the junction of interest) is approximately +100 volts, which is considerably less than the value of +115 volts developed at this point by the two match conditions.

The remaining condition of mismatch occurs when amplifier AM1 is drawing no plate current (corresponding to a binary 0) and when code relay CR1 is operated (corresponding to a binary 1). Under this condition, point L in the circuit resides at a potential of approximately +130 volts, point N in the circuit resides at approximately +130 volts and, accordingly, point M, the junction of interest, is also at a potential of approximately +130 volts.

Thus, it will be observed that in the typical channel of match unit MU described above, the potential at the junction of resistances R1C and R1D designated point M is approximately +115 volts for either of the two possible match conditions and aproximately 15 volts greater or less than this value for the two possible mismatch conditions. Each channel of match unit MU of which there are five shown in the illustrative embodiment of the present invention is provided with similar arrangements just described. It is to be understood, however, that matching unit MU is not limited to five channels and that a greater number as desired may be utilized. To determine whether a match exists between the input code supplied over the A— input leads and the input code supplied over the B— input leads, it is thus necessary to determine whether any of the five resistance junctions designated M has a potential difference from 115+ volts. If any junction is different from +115 volts, there is a mismatch; if all junctions are at a +115 volt potential, there is a complete match and this fact will be used to provide an output signal as described below.

To detect and recognize the voltage conditions of the five resistance junction points designated M in match unit MU (only two of which are shown in the drawing), two OR gates of six varistors each are employed. The right-hand group of varistors designated VR1C through VR5C (of which VR2C through VR4C are not shown in the drawing) and varistor VR7 constitute a negative going OR gate or, in other words, an OR gate responsive to negative pulses. This negative OR gate is supplied with a positive bias from a +130 volt potential source through resistance R6. As indicated in the drawing, each of the outputs or resistance junctions designated M is connected to an individual one of the inputs of this OR gate and, in addition, the input which includes varistor VR7 is supplied with a nominal potential of +115 volts to define a threshold of operation for the OR gate. Varistor VR7 is polarized so as to limit the maximum potential at the output of this OR gate to +115 volts although it is urged toward +130 volts by the bias current supplied through resistance R6. As shown in the drawing, the output bus from this negative OR gate is designated Y. Any of the channel resistance junctions M which shows a mismatch by approaching a +130 volt potential will have virtually no effect upon the output of this gate as the associated varistor will merely be biased into the back-resistance condition while varistor VR7 holds the output potential on the Y bus to +115 volts. If, however, any of the resistance junctions exhibits the other type of mismatch which drops the potential thereat toward the +100 volt condition, the Y bus will follow along and deliver a corresponding +100 volt output potential.

The other OR gate is comprised of the left-hand group of varistors designated VR1B through VR5B (of which VR2B through VR4B are not shown in the drawing) and varistor VR6. This OR gate is a positive going OR gate or, in other words, an OR gate responsive to positive pulses. This positive OR gate is supplied with a negative bias from a —48 volts potential source through resistances R7 and R8. As indicated in the drawing, each of the outputs or resistance junctions designated M is connected to an individual one of the inputs of this OR gate and, in addition, the input which includes varistor VR6 is supplied with a nominal potential of +115 volts to define a threshold of operation for the OR gate. As shown in the drawing, the output bus of this OR gate is designated X. Varistor VR6 is polarized so as to maintain the output potential of this OR gate on the X bus at +115 volts even though it is urged toward a lower potential by the bias current supplied through resistances R7 and R8. A +100 volt type of mismatch will have virtually no effect on the output of this gate. If, however, any of the resistance junctions exhibits the +130 volt type of mismatch, the X bus will follow along and deliver a corresponding +130 volt output potential.

We therefore have the situation where any of the resistance junctions which shows a +130 volt type of mismatch will cause the X bus to rise materially above +115 volts while any of the resistance junctions which shows a +100 volt type of mismatch will cause the Y bus to fall materially below +115 volts. Only when all of the resistance junctions are showing a match condition of +115 volts potential will the potentials of the X and Y busses be substantially alike and equal to +115 volts.

By supplying a threshold potential of +115 volts to each of the OR gates through varistors VR6 and VR7 as described above, a reduction of the steady current drain at the resistance junction in match unit MU is effected. This permits the detection of the voltage condition at a greater number of such resistance junctions and means that binary codes having a greater number of individual code elements may be compared in such a matching circuit.

As shown in the drawing, the X bus is connected through resistance R7 to the grid of the left-hand triode AX of differential amplifier DF and the Y bus is connected through resistance R12 to the grid of the right-hand triode AY of differential amplifier DF. Because of the highly variable duty cycle involved in matching signal codes where one input is obtained from a rotating magnetic drum, the differential amplifier DF is direct-current coupled to the match unit MU. Furthermore, because as indicated above, the illustrative embodiment of the present invention may be advantageously utilized as the matching circuit in the magnetic drum translator disclosed in the above-cited copending application of H. A. Henning et al., it is advantageous to use a +130 volt plate supply potential for the differential amplifier as this potential is readily available in telephone offices wherein the translator may be installed. Therefore, the outputs on busses X and Y are each fractionated to almost the same extent of about one-half before being applied to the grids of the AX and AY triodes of differential amplifier DF. This is accomplished by means of precision resistances in the voltage divider comprising resistances R7 and R8 and by precision resistances in the voltage divider comprising resistances R10, R11 and R12. Typically, resistances R7 and R12 have the same value, and resistances R8 and R11 have the same value. Resistances R7 and R12 are capacity compensated by condensers C1 and C2 to insure high speed response.

When a match is obtained in match unit MU, both X and Y busses are at a +115 volt potential. The right-hand triode AY will then conduct current because its grid will be at a more positive potential than the grid of the left-hand triode AX owing to the presence of resistance R10 at the bottom of the voltage divider which upsets the exact equality of the voltage fractionation from the two busses, X and Y. In all other circumstances, however, the right-hand triode AY will be cut off. This results because of the X bus being at a higher potential than the Y bus in one of the following three patterns:

$X=+130$ $Y=+115$
$X=+115$ $Y=+100$
$X=+130$ $Y=+100$

In all of these cases, the potential at the common cathode of triodes AX and AY of differential amplifier DF developed across resistance R9 will tend to follow the potential of the X bus and is somewhat more positive than the potential of the grid of left-hand triode AX. The potential developed at the common cathode due to the conduction of the left-hand triode AX causes the cathode of the right-hand triode AY to be considerably more positive than its grid and, hence, the right-hand triode is cut off.

It will therefore be observed that if any of the five channels shows a mismatch of the type which takes its junction below +115 volts, the negative going OR gate will cause the potential on the Y bus to fall below +115 volts which reduces the potential applied to the grid of the right-hand triode AY and causes this triode to be cut off. If, on the other hand, any resistance junction shows a mismatch which raises its potential toward +130 volts, this change will be communicated via the positive going OR gate over the X bus to the grid of the left-hand triode AX which will conduct current and raise the common cathode potential thereby cutting off the plate current of the right-hand triode AY. Thus, for either type of mismatch, the output of the differential amplifier will be a potential equal to the plate potential supply of +130 volts, for example. When a match occurs and the right-hand triode AY conducts, an output signal from the differential amplifier DF is obtained which may, for example, be a negative going pulse of about 20 volts magnitude from a standing potential of +130 volts.

It is to be understood that the above-described arrangement is but illustrative of the present invention and that the invention is not limited to the use of the potentials specified or to the matching of binary codes having only five code elements. Numerous other arrangements may be devised by those skilled in the art without departing from the spirit and scope of the invention.

What is claimed is:

1. A matching circuit for matching binary signal codes comprising in combination, two input leads, electronic means for applying one or the other of two input potential conditions in accordance with a binary code to one of said two input leads, means for applying one or the other of two input potential conditions in accordance with the binary code to the other of said two input leads, clamping means connected to said one of said input leads for limiting the potential thereon to a predetermined excursion, comparing means connected to said two input leads and responsive to the input potentials thereon for providing an output potential indicative of the condition of match or mismatch of the binary codes represented by said input potentials, output means responsive to a predetermined reference potential from the output of said comparing means for producing a match signal, means connected to the output of said comparing means and responsive to a potential, positive with respect to said reference potential, for preventing said output means from producing said match signal, means connected to the output of said comparing means and responsive to a potential, negative with respect to said reference potential, for preventing said output means for producing said match signal and threshold means for supplying said reference potential.

2. A matching circuit for matching binary signal codes comprising in combination, two groups of input leads, means for applying one or the other of two potential conditions in accordance with a binary code to the individual leads of one of said two groups of said input leads, means for applying one or the other of two potential conditions in accordance with a binary code to the individual leads of the other of said two groups of said input leads, a plurality of voltage dividing means each individually connected between corresponding leads of said two groups of said input leads, each of said voltage dividing means responsive to the potential conditions applied thereto by said input leads associated therewith to provide an output potential representing the condition of match or mismatch of the individual binary code elements represented by said input potential conditions, means connected to each of said voltage dividing means for limiting the potential applied thereto from said input leads to a predetermined excursion, detecting means for detecting the potential condition at the output of each of said voltage dividing means, output means controlled by said detecting means and operative when the output potentials from each of said voltage dividing means equals a predetermined reference potential and threshold means for supplying said predetermined reference potential to said detecting means and said output means.

3. A matching circuit for matching binary signal codes comprising in combination, two groups of input leads, means for applying one or the other of two potential conditions in accordance with a binary code to the individual leads of one of said two groups of said input leads, means for applying one or the other of two potential conditions in accordance with a binary code to the individual leads of the other of said two groups of said input leads, a plurality of voltage dividing means each individually connected between corresponding leads of said two groups of said input leads, means connected to each of said voltage dividing means for limiting the potential applied thereto from said input leads to a predetermined excursion, a differential amplifier responsive to a predetermined reference potential on each of two inputs thereto for providing an output signal, threshold means for supplying said predetermined reference potential to said two inputs of said differential amplifier, a first OR gate connected to each of said voltage dividing means and responsive to a positive potential excursion above said reference potential for applying a potential, positive with respect to said reference potential to one of said inputs of said differential amplifier and a second OR gate connected to each of said voltage dividing means and responsive to a negative potential excursion below said reference potential for applying a potential, negative with respect to said reference potential, to the other of said inputs of said differential amplifier.

References Cited in the file of this patent

UNITED STATES PATENTS

| | | |
|---|---|---|
| 2,641,696 | Woolard | June 9, 1953 |
| 2,675,539 | McGuigan | Apr. 13, 1954 |
| 2,715,718 | Holtje | Aug. 16, 1955 |
| 2,756,409 | Lubkin | July 24, 1956 |

FOREIGN PATENTS

| | | |
|---|---|---|
| 156,443 | Australia | May 12, 1954 |